(12) United States Patent
Origuchi et al.

(10) Patent No.: US 8,313,854 B2
(45) Date of Patent: Nov. 20, 2012

(54) ELECTRICITY GENERATION MODULE INCLUDING A PLURALITY OF ELECTROCHEMICAL CELLS AND SUPPORT PLATES FORMING SPACERS FOR THE ELECTROCHEMICAL CELLS

(75) Inventors: Masato Origuchi, Rambouillet (FR); Francois Orsini, Massy (FR)

(73) Assignee: Renault S.A.S., Boulogne-Billancourt (FR)

( * ) Notice: Subject to any disclaimer, the term of this patent is extended or adjusted under 35 U.S.C. 154(b) by 1104 days.

(21) Appl. No.: 12/095,821

(22) PCT Filed: Nov. 21, 2006

(86) PCT No.: PCT/FR2006/051204
§ 371 (c)(1),
(2), (4) Date: Jun. 2, 2008

(87) PCT Pub. No.: WO2007/063234
PCT Pub. Date: Jun. 7, 2007

(65) Prior Publication Data
US 2008/0280173 A1    Nov. 13, 2008

(30) Foreign Application Priority Data
Dec. 2, 2005 (FR) .................................... 05 12252

(51) Int. Cl.
*H01M 2/00* (2006.01)
*H01M 2/10* (2006.01)
*H01M 6/42* (2006.01)
*H01M 6/46* (2006.01)

(52) U.S. Cl. .......... 429/151; 429/99; 429/100; 429/148; 429/149; 429/154

(58) Field of Classification Search ............. 429/149, 429/99, 100, 148, 151, 154
See application file for complete search history.

(56) References Cited

U.S. PATENT DOCUMENTS

| 6,689,510 B1 | 2/2004 | Gow et al. | |
|---|---|---|---|
| 2001/0007728 A1* | 7/2001 | Ogata et al. | 429/120 |
| 2003/0118898 A1 | 6/2003 | Kimura et al. | |
| 2006/0240318 A1* | 10/2006 | Kim et al. | 429/153 |
| 2006/0246348 A1* | 11/2006 | Hamada et al. | 429/148 |

FOREIGN PATENT DOCUMENTS

| JP | 2005 302501 | 10/2005 |
|---|---|---|
| JP | 2005 302698 | 10/2005 |
| KR | 20-0159136 Y1 * | 10/1999 |
| WO | WO 2004112172 A1 * | 12/2004 |

OTHER PUBLICATIONS

Okakazaki et al., Machine translation of JP 2005302501 A, Oct. 2005.*
Tono, T., Machine translation of JP 2005302698 A, Oct. 2007.*
Jeong, Do-Yang, Machine translation of KR 20-0159136 Y1, Oct. 1999.*

* cited by examiner

*Primary Examiner* — Basia Ridley
*Assistant Examiner* — Sean P Cullen
(74) *Attorney, Agent, or Firm* — Oblon, Spivak, McClelland, Maier & Neustadt, L.L.P.

(57) ABSTRACT

An electricity generation module including: a plurality of basic electrochemical cells; plates for supporting the basic cells, the support plates forming spacers for two consecutive basic cells; and a loading mechanism configured to maintain the relative position of the basic cells and the support plates by pressure.

14 Claims, 3 Drawing Sheets

ELECTRICITY GENERATION MODULE INCLUDING A PLURALITY OF ELECTROCHEMICAL CELLS AND SUPPORT PLATES FORMING SPACERS FOR THE ELECTROCHEMICAL CELLS

The present invention relates to the field of electricity generation modules for motor vehicles, and in particular an electricity generation module comprising a plurality of electrochemical cells and suitable for an electric vehicle or a hybrid vehicle.

BACKGROUND

A hybrid propulsion or traction vehicle is normally equipped with an internal combustion traction engine and an electric traction engine which is powered by an electricity generation module on board the vehicle, so as to be able to use several energy sources.

Such electricity generation modules, or batteries, for hybrid or electric vehicles can be provided with a plurality of identical assemblies. Each assembly comprises basic electrochemical cells making it possible to produce the electrical energy by chemical reactions occurring at the electrodes.

Such basic electrochemical cells are particularly advantageous in terms of both energy and economy. However, each of these cells has a relatively small thickness and a relatively low mechanical resistance, which can make their assembly and their relative positioning difficult when the modules are manufactured.

Various solutions have already been devised to facilitate the production of such modules. Thus, the abstract of the patent application JP-A1-2004-227921 describes a support for stacked basic electrochemical cells provided with bottom and top bearing means. Each bearing means comprises two rectilinear bars assembled together so as to form a cross and each provided at their ends with a fixing block, the fixing blocks of a bearing means cooperating with the fixing blocks of the other bearing means.

The bars and the fixing blocks thus form a support for the basic electrochemical cells which are previously welded to each other so as to be applied one on top of the other by their main faces. For more details on techniques for welding basic cells, the reader can, for example, refer to the abstract of patent application JP-A1-2004-253262.

Such a support for basic electrochemical cells has the drawback of proposing an arrangement requiring preliminary basic cell welding operations which are particularly lengthy, difficult and costly. Also, assembling plates bearing against each other does not allow for effective cooling.

BRIEF SUMMARY

The aim of the present invention is therefore to remedy these drawbacks, by proposing an electricity generation module enabling basic electrochemical cells to be assembled in a particularly safe, rapid and effective way, while facilitating the cooling of said cells in order to increase the efficiency and the life of the module.

According to one aspect of the invention, the electricity generation module comprising a plurality of basic electrochemical cells is provided with support plates for the basic cells, said support plates forming spacers for two consecutive basic cells, and loading means configured to maintain the relative positioning of said basic cells and the support plates by means of pressure.

With such an arrangement, it then becomes possible to produce an electricity generation module in which the electrochemical cells are positioned relative to each other easily and rapidly, while providing satisfactory cooling of said cells.

Indeed, the provision of such plates makes it possible not only to ensure the relative positioning of the cells, but also to retain a constant spacing between them, so that a cooling gas, air for example, can circulate.

Also, the use of loading means which maintain the relative positioning of the basic cells and the support plates by means of pressure provides a way of circumventing particularly difficult and costly operations for assembling cells together, such as welding, providing for a particularly economical device.

Preferably, each support plate is associated with at least two basic cells arranged side by side.

Advantageously, the module is provided with friction elements fitted between the basic cells and the associated support plates. Such friction elements increase the security with which the basic cells are kept in position relative to the support plates.

In a preferred embodiment, the friction elements are the support plates, said plates having a roughness substantially greater than that of the basic cells.

The module can advantageously include at least one elastically deformable element fitted to bear against a top basic cell.

The use of such an elastically deformable element thus makes it possible to overcome any differential thermal expansions between the basic cells, the support plates, and the loading means. Furthermore, this elastically deformable element can also absorb the basic cell thickness tolerance defects, and any variations of said thickness according to the state of charge or discharge of the cell.

Preferably, the deformable element is made of flexible synthetic material, the support plates being made of rigid synthetic material.

According to one aspect of the invention, the support plates comprise electricity-conducting or insulating means.

Said means can be made of a single piece with the support plates, so as to simplify the fitting of the module.

Preferably, the module comprises a base on which are fitted the loading means for the relative positioning of said basic cells and support plates.

Advantageously, the support plates are made up of an assembly of a support frame for the cells and at least one connection part for electrically linking said cells to each other.

BRIEF DESCRIPTION OF THE DRAWINGS

The present invention and its advantages will be better understood by studying the detailed description of an exemplary but by no means limiting embodiment, illustrated by the appended drawings, in which.

DETAILED DESCRIPTION

Figure 1:
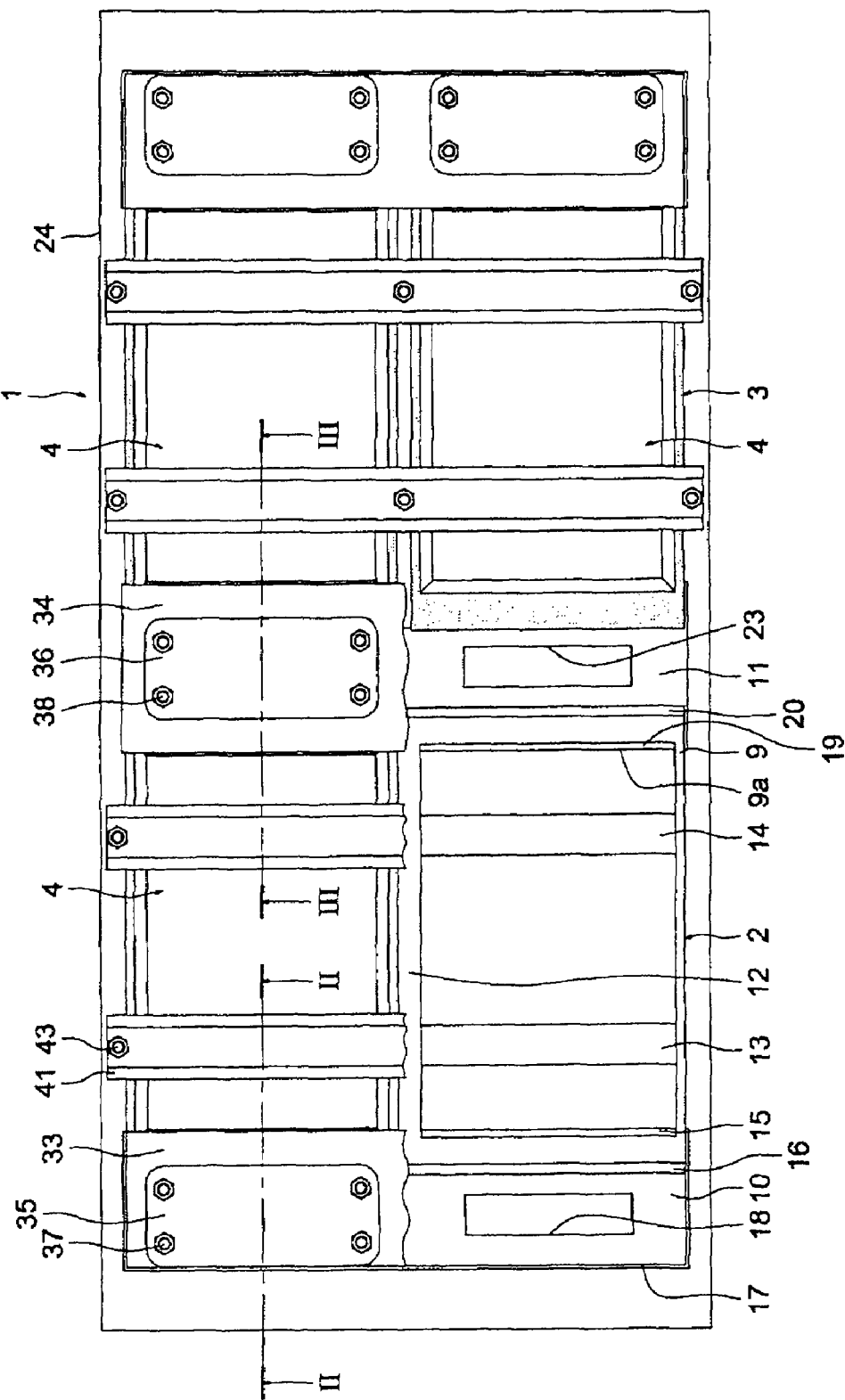
FIG. 1 is a diagrammatic top view of an electricity generation module according to one aspect of the invention.
Figure 2:
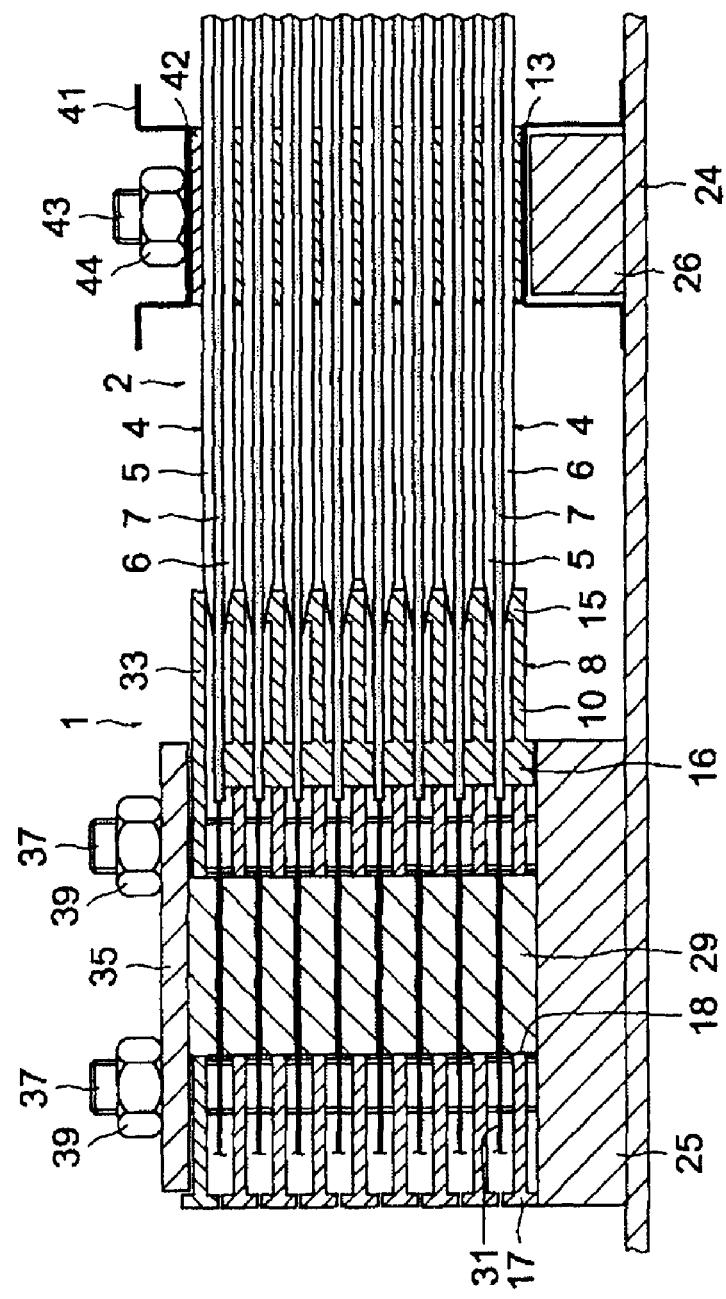
FIGS. 2 and 3 are respectively cross-sections along the axes II-II and III-III of the electricity generation module of FIG. 1.
Figure 3:
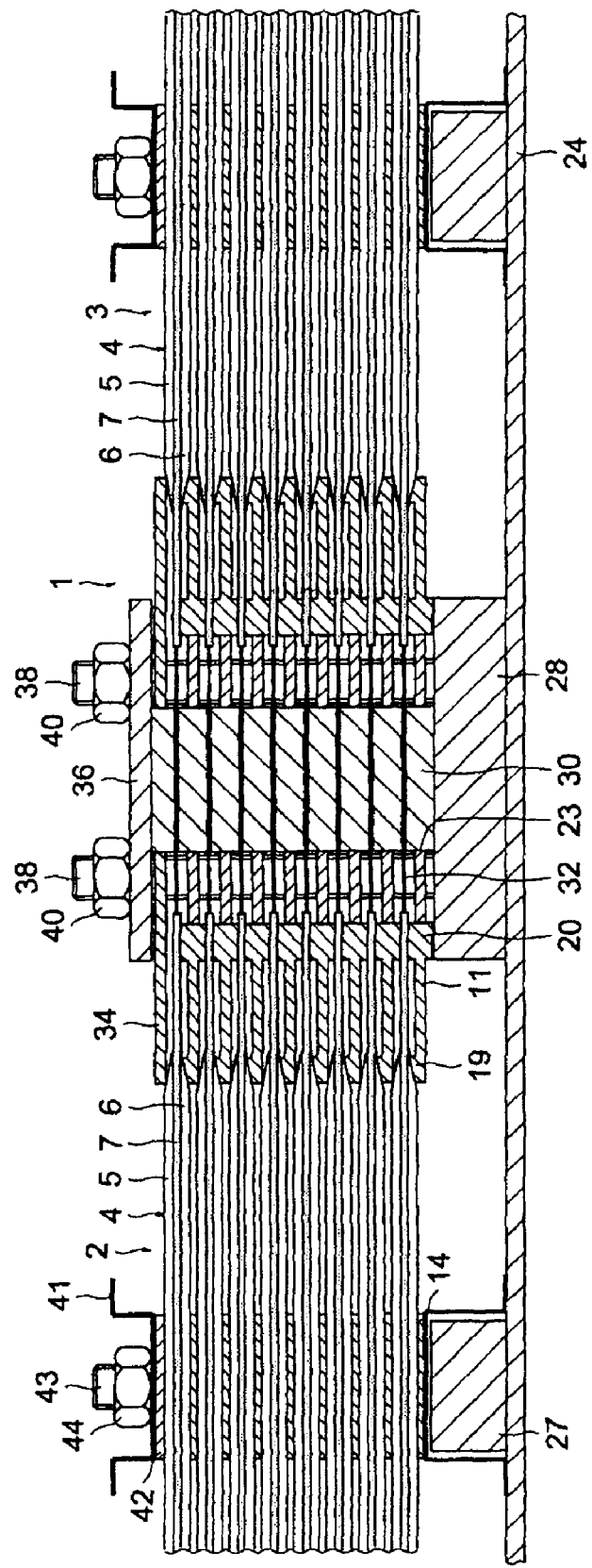

Referring to FIGS. 1 to 3, there now follows a description of one embodiment of the electricity generation module, designated by the general numeric reference 1, and intended in particular for an electric motor vehicle or even a hybrid motor vehicle.

The module 1, seen from above, has a generally rectangular shape and in this case comprises two assemblies 2 and 3 connected to each other and each provided with a plurality of identical basic electrochemical cells 4. The cells 4 are arranged to form, for each of the assemblies 2 and 3, two identical vertical rows. Thus, the cells 4 of one row are horizontally aligned with those of the other row so as to form pairs of cells. In FIG. 1, one of the rows of cells 4 of the assembly 2 is not represented, in the bottom left area.

To produce the energy, each cell 4 conventionally comprises a cathode 5 and an anode 6 separated by an electrolyte 7. The electrolyte 7 can be a polymer separator of the membrane type, soaked with a liquid electrolyte polymer of the organic solvent type with lithium salt.

For clarity in FIGS. 2 and 3, the assemblies 2 and 3 are each represented with eight basic cells 4. Obviously, the number of cells normally envisaged in total is substantially different. Indeed, the power needed to pull a motor vehicle is several tens of kilowatts, which requires a large number of cells 4 to be stacked.

For the assembly 2 of the module 1, each pair of basic cells 4 has an associated plate 8 to provide support for and ensure the relative positioning of these cells 4. The support plates 8, generally rectangular in shape, can have a relatively small thickness compared to those of the cells 4 in order to obtain a compact device 1. Said thickness can, for example, be of the order of a millimeter.

The plate 8 comprises a support frame 9 and two substantially similar side pieces 10, 11 which are assembled on said frame, by snap-fitting for example, to form a unitary assembly.

The generally rectangular frame 9 is provided with a first central strip 12 linking its long side edges, and second and third strips 13, 14 linking its short side edges and each placed in the vicinity of one of said long edges. The strip 12 thus delimits two identical openings 9*a*, only one of the openings being visible in FIG. 1. These openings 9*a* provide a way in particular of connecting terminals of cells 4.

The frame 9, at the level of the long side edge opposite the assembly 3, is provided with a vertical rim 15 extending upward, and a vertical fold 16 extending on either side of main faces of said frame. The rim 15 and the fold 16 extend over the entire length of the frame 9. The fold 16 is provided on the external side of said edge of the frame 9. The rim 15 is located on the internal side of said edge and provided with a top tapered surface.

On the long opposite side edge, the frame 9 also includes a rim 19 and a fold 20 similar to those described previously. The tapered surfaces of the rims 15, 19 are intended to support the bottom faces of a pair of cells 4, the folds 16, 20 forming supports for said bottom faces.

The lateral piece 10 takes the form of a generally rectangular plate, and horizontally extends the frame 9 outward from the fold 16. It comprises a vertical surround 17 provided on the perimeter of the long external edge and the short edges, the surround 17 extending either side of the main faces of the piece 10. The lateral piece 10 also includes two voids 18 provided in the vicinity of the surround 17 and each associated with one of the rows of cells.

The lateral piece 11 also takes the form of a rectangular plate, with a structure that is, however, slightly different to that of the lateral piece 10. In practice, the lateral piece 11 is intended to be used for a pair of cells 4 of the assembly 2 but also for the corresponding pair of cells 4 of the assembly 3.

The lateral piece 11 is therefore common to the assemblies 2 and 3 of the module. Thus, the piece 11 comprises two vertical surrounds (not referenced) provided on the perimeter of the short edges. The piece 11 also includes two voids 23 positioned in a way similar to those of the piece 10.

The design of the assembly 3 is identical to that of the assembly 2. Obviously, the number of assemblies of the module 1 is adaptable according to the power or energy required.

There now follows a description of the relative arrangement of the support plates 8 and the basic cells 4 of the assembly 2.

The bottom support plate 8 is fitted to bear against a base 24 via blocks 25 to 28. The blocks 25 to 28 respectively bear against the bottom faces of the fold 16 and of the surround 17, of the strip 13, of the strip 14, and of the fold 20. The bottom main face of each of the two bottom cells 4 bears against said plate level with the top surfaces of the strips 12 to 14 and rims 15, 19.

The immediately higher support plate 8 bears against the top main faces of the two bottom cells 4, respectively via bottom faces of the folds 16, 20 and of the strips 12 to 14. Said plate 8 thus forms a support for the cell 4 immediately above the bottom basic cell, but also forms a spacer between said cells so as to maintain a substantially constant spacing between these cells and so allow for a gas to circulate for cooling purposes.

The positioning of the six other support plates 8 and cells 4 of the assembly 2 is similar to that described previously. Also, the relative arrangement of the support plates 8 and the basic cells 4 of the assembly 3 is identical to that of the assembly 2.

So as to electrically connect the various cells 4 to each other, conducting or insulating means 29, 30 are fixed respectively inside the voids 18 and 23 of each of the pieces 10, 11. The use of conducting or insulating means 29, 30 is determined according to whether the cells 4 are to be electrically connected in series or in parallel.

To this end, each cell 4 comprises two connection tabs 31 and 32 linked to each of its ends, and taking the form of thin metal sheets with a width slightly less than the width of the corresponding cell. For clarity in the figures, the tabs 31 and 32 are here linked to the electrolyte 7. Obviously, it is easy to imagine that each cell 4 in reality comprises an outer jacket (not represented), to which the tabs 31 and 32 are connected.

The means 30 are used to electrically link the cells 4 of the assembly 3 with the cells of the assembly 2. The frame 9 is thus used as a support for the cells 4, the parts 10 and 11 being provided for the electrical connection of said cells to each other.

In order to maintain the relative positioning of the basic cells 4 and the stacked plates 8 of the assembly 2, the module 1 also comprises means of loading said plates and cells by pressure. The loading means are provided with flanges 33, 34 in contact against the top cells 4, pressure plates 35, 36 associated with the flanges, and fixing rods 37, 38.

The flanges 33, 34 have dimensions that are adapted to respectively cover the top lateral pieces 10, 11. They bear against the top cells 4 and each comprise voids (not referenced) for top means 29, 30 to pass through so that the top faces of said flanges are vertically offset downward relative to those of said means 29, 30.

Each flange 33, 34 has two plates 35, 36 associated with it, with dimensions slightly greater than those of the means 29, 30 and arranged so as to bear respectively against the top surfaces of the top means 29, 30. Between the plates 35, 36 and the top bearing means 29, 30, metal bars (not represented) are fitted to provide an electrical contact between two adjacent rows of cells 4.

The threaded fixing rods 37, of which there are four here, for each plate 35 pass through said plates and through the plates 8, via holes provided for this purpose, and are used to fasten the support plates 8 and the cells relative to the base 24, respectively at the level of the block 25. To this end, nuts 39 are fitted on said rods bearing against the top surfaces of the plates 35.

Similarly, the rods 38 and nuts 40 are used, via the flange 34, to fix the plates 8 and the cells relative to the base 24, at the level of the block 28. The flange 34 is thus partly used for fixing the cells of the assembly 2 and for fixing the assembly 3. On the side opposite the flange 34, the assembly 3 also comprises another flange (not referenced) for fixing the other end of the cells 4.

For each assembly of the module 1, the loading means are also provided with two transverse pressure bars 41 bearing against the top surfaces of the top cells, via elastically deformable elements 42. The pressure bars 41 are identical to each other and have a length roughly equal to that of the long sides of the frame 9. They are vertically aligned relative to the blocks 26 and 27.

The deformable elements 42 take the form of rectangular strips with lengths equal to those of the pressure bars 41. Advantageously, said elements are made of flexible synthetic material, for example of ethylene propylene diene monomer (EPDM). Threaded rods 43 and nuts 44, of which there are three here on each of the bars 41, are also provided to maintain the fixing of the plates 8 and of the cells 4 to the base 24. The bottom ends of the rods 43 are here mounted at the level of the blocks 26 and 27.

The provision of such elements 42 bearing against the top cells 4 thus makes it possible to apply a pressure to the cells 4 in order to substantially limit the risk of any relative displacement of the plates 8 and of said cells, while overcoming any differential thermal expansions between the basic cells 4, the support plates 8 and the rods 43. Such elements 42 also make it possible to absorb any variations in thickness of the cells according to their state of charge or discharge.

So as to increase the security with which the plates 8 are held in position relative to the cells 4 while retaining a compact module 1, the plates 8 can be made of rigid synthetic material, for example polypropylene (PP) to obtain a friction coefficient between said plates and the cells 4 that is designed to retain the horizontal positioning of the cells 4 relative to the plates by means of friction.

Obviously, it would also be possible to consider providing specific elements provided for this purpose, positioned between the cells 4 and the plates 8.

The electricity generation module thus makes it possible to obtain a particularly easy and reliable assembly of the various basic cells in which the cells are in particular spaced apart from each other, which makes it possible to provide for a circulation of cooling gas to obtain optimum operation of the module. Also, the number of assemblies of the module and the number of cells of each of said assemblies can easily be adapted according to the desired power and energy.

The invention claimed is:

1. An electricity generation module comprising:
a plurality of basic electrochemical cells, each of the basic cells including a cathode, an anode, and an electrolyte that separates the cathode from the anode;
support plates for the basic cells, the support plates forming spacers for two consecutive basic cells, one of the support plates includes a rectangular frame including a first long side, a second long side, a first short side, and a second short side, the first long side and the second long side being longer than the first short side and the second short side, the rectangular frame surrounding an opening within the rectangular frame, the rectangular frame including a first rim and a first fold on a first long side of the rectangular frame and a second rim and a second fold on a second long side of the rectangular frame, the first rim, the second rim, the first fold, and the second fold all being in contact with a first one of the basic cells, the first rim being located on an internal side of the one of the support plates and the first fold being located on an external side of the one of the support plates, and the first rim and the first fold extend over an entire length of the support plate; and
a loading mechanism configured to maintain relative positioning of the basic cells and the support plates by pressure.

2. The module as claimed in claim 1, in which each support plate is associated with at least the two basic consecutive cells.

3. The module as claimed in claim 1, in which the support plates are friction elements, the support plates having a roughness substantially greater than that of the basic cells.

4. The module as claimed in claim 1, further comprising at least one elastically deformable element fitted to bear against a top basic cell.

5. The module as claimed in claim 4, in which the deformable element is made of flexible synthetic material, the support plates being made of rigid synthetic material.

6. The module as claimed in claim 1, in which the support plates comprise an electricity-conducting or insulating mechanism.

7. The module as claimed in claim 1, further comprising a base on which is fitted the loading mechanism for relative positioning of the basic cells and support plates.

8. The module as claimed in claim 1, in which the support plates include at least one connection part for electrically linking the basic cells to each other.

9. The module as claimed in claim 1, wherein the first rim of the one of the support plates is in contact with a top face of the first one of the basic cells and a bottom face of a second one of the basic cells.

10. The module as claimed in claim 1, wherein the first rim includes a tapered surface in contact with the first one of the basic cells.

11. The module as claimed in claim 1, wherein the first rim and the first fold are in contact with a bottom face of the first one of the basic cells.

12. The module as claimed in claim 1, wherein the frame includes a central strip linking the first long side and the second long side to divide the opening into a first opening and a second opening.

13. The module as claimed in claim 12, wherein the first one of the basic cells covers the first opening and an adjacent one of the basic cells covers the second opening.

14. The module as claimed in claim 13, wherein the first rim, the second rim, the first fold, and the second fold are all in contact with the first one of the basic cells and the adjacent one of the basic cells.

* * * * *